March 1, 1938.  H. BECKER  2,109,454
APPARATUS FOR CUTTING GROOVED ROLLS
Filed April 9, 1936  4 Sheets-Sheet 4
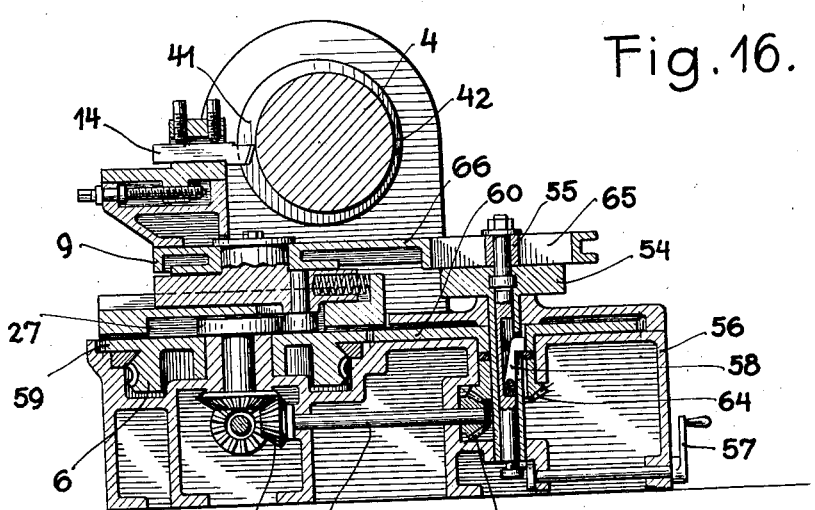
Fig. 16.
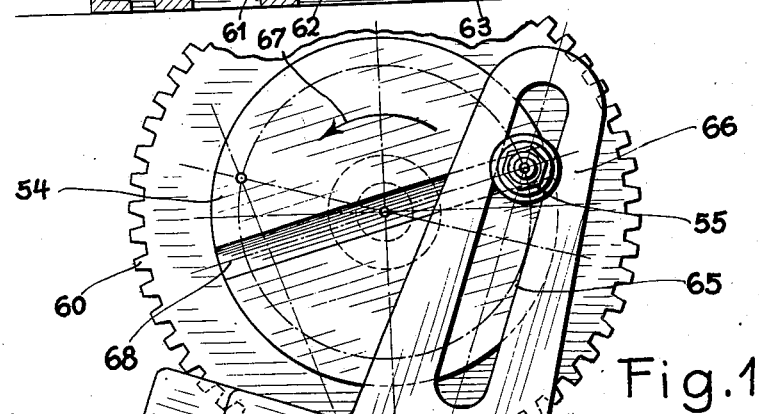
Fig. 17.
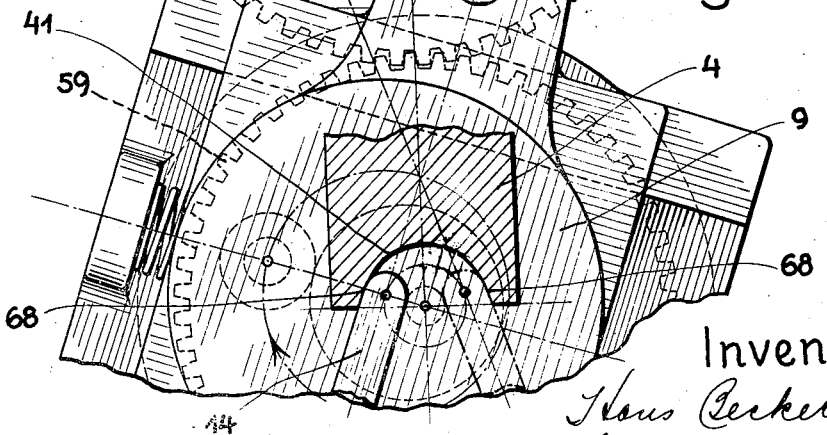
Inventor:
Hans Becker,
By Thomas Appleman
atty.

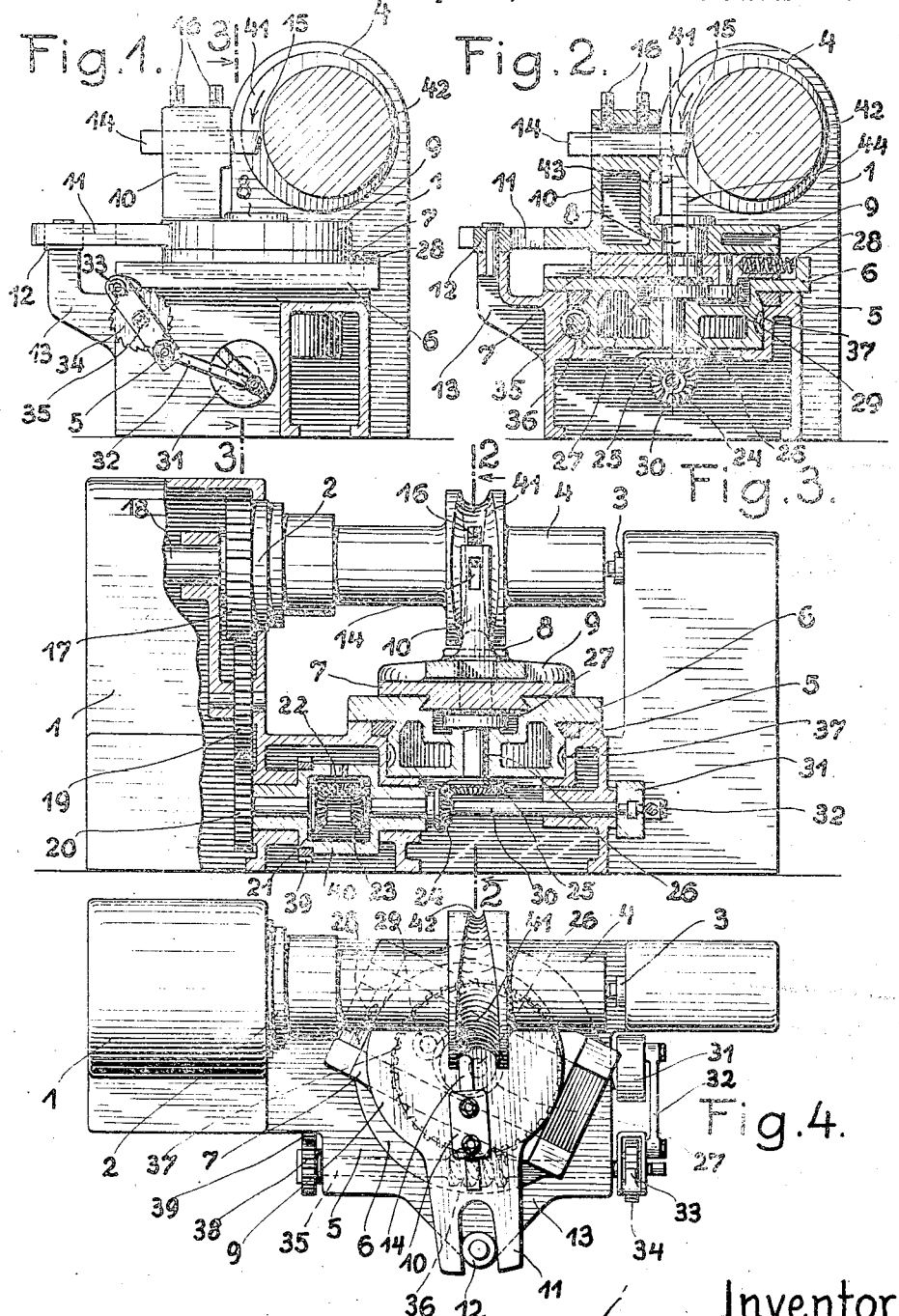

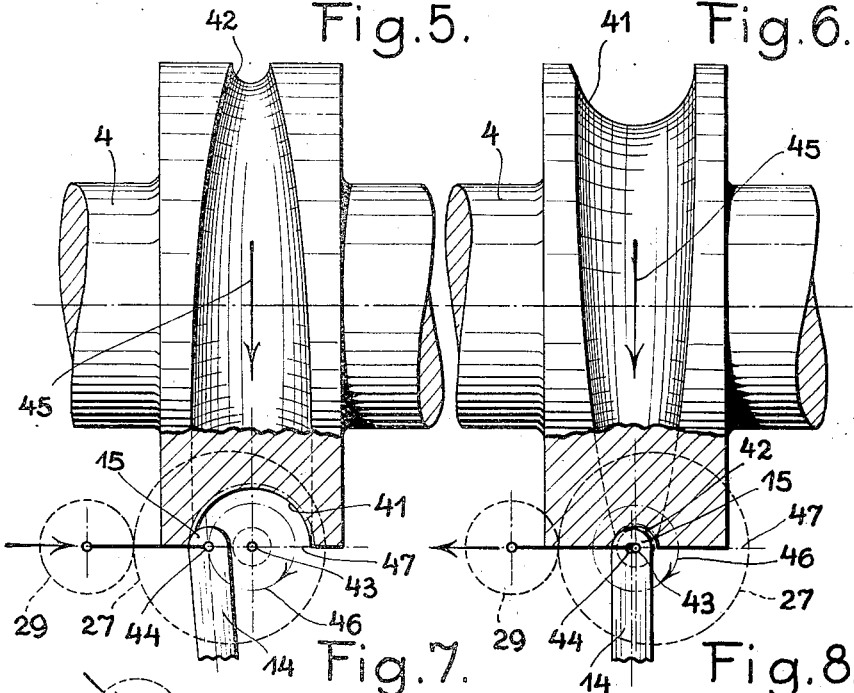

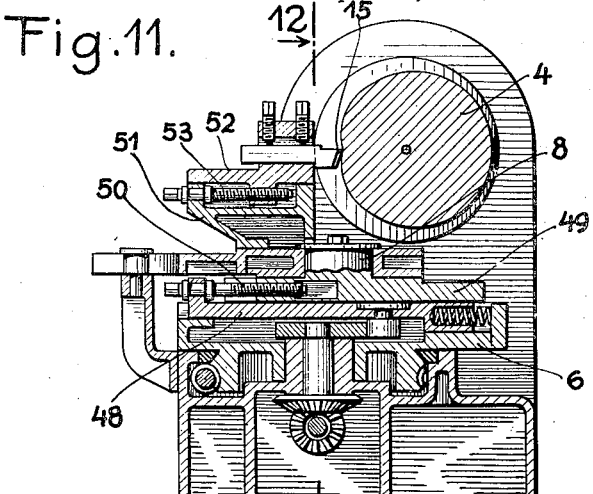
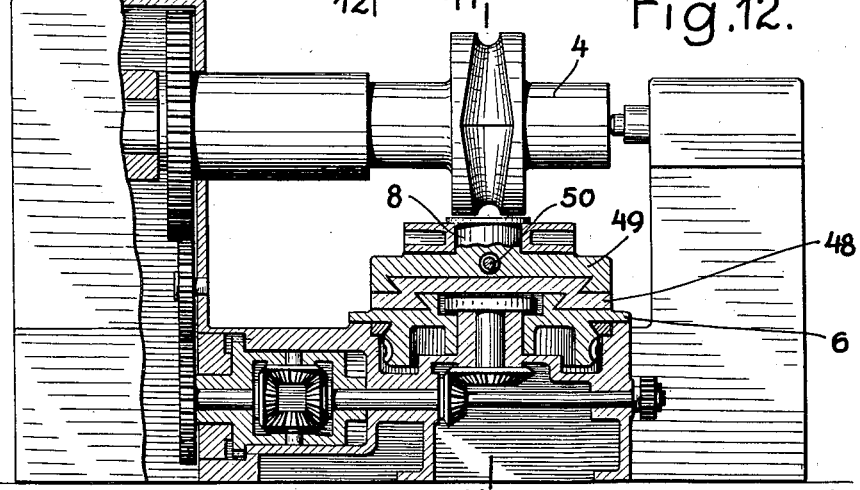
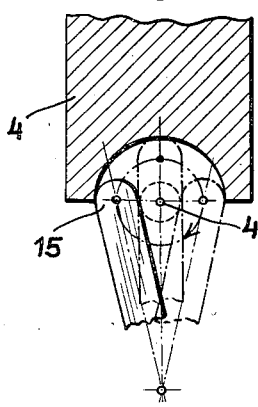 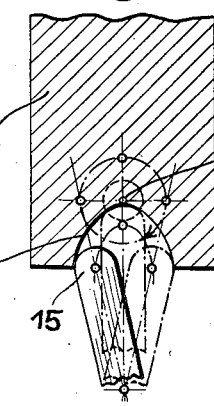 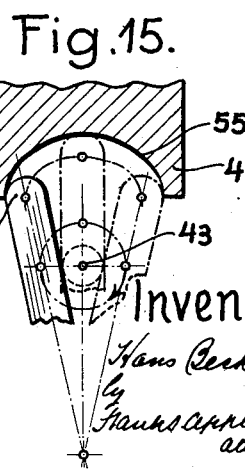

Patented Mar. 1, 1938

2,109,454

UNITED STATES PATENT OFFICE 2,109,454

APPARATUS FOR CUTTING GROOVED ROLLS

Hans Becker, Dusseldorf, Germany

Application April 9, 1936, Serial No. 73,582
In Germany September 11, 1935

17 Claims. (Cl. 82—18)

The present invention relates to a method for cutting roll grooves, particularly small round grooves in rolls such for example as are used for reducing tubes or for similar purposes. These rolls show in axial section semicircular grooves with different radii, the centres of curvature of which lie in the plane of the periphery of the roll. The cutting of these rolls has been carried out hitherto with a boring tool which rotated between two rolls mounted parallel with each other. In this case the radius which the tool describes, is varied by a curved template. The disadvantage of this method of treatment is that the tool can be only very small and it is very difficult to cut a small roller.

According to the present invention it is proposed to cut the groove in the roll in a lathe, and by means of a rotating tool mounted at right angles to the axis of the roll and set radially with respect thereto, and this tool is moved to and fro as the roll rotates in accordance with the changing width of the groove, and is at the same time moved forwards and backwards in accordance with the changing depth of the groove.

The apparatus which enables the turning tool to be moved in this way comprises a bearing member which rotates slowly in accordance with the feed or advance of the cut and carries a slide rest which rotates in unison and is controlled during the rotation in accordance with the necessary movements of the turning tool. The tool holder is so mounted on the slide rest that it follows the movements of the same but does not rotate therewith.

A number of constructional examples of the apparatus which serves to carry out the method according to the present invention are shown in the accompanying drawings.

Fig. 1 shows one constructional form in end elevation and

Fig. 2 is a vertical transverse section, while

Fig. 3 is a vertical axial section and

Fig. 4 is a plan view.

Figs. 5 to 10 show diagrammatically the way in which the apparatus works.

Fig. 11 is a vertical transverse section of a second constructional form and

Fig. 12 is a vertical axial section thereof.

Figs. 13 to 15 show diagrammatically the way in which this apparatus works.

Fig. 16 shows a third constructional form in vertical transverse section, while

Fig. 17 shows diagrammatically the way in which this apparatus works.

In the constructional form shown in Figs. 1 to 4, there is provided on the frame 1 of the machine a face plate 2 or a chuck and opposite this a lathe centre 3, between which the roller 4 to be operated on is chucked. In the bed 5 of the machine is mounted a table 6, on which a slide rest 7 is movably carried. A pin 8 of the slide rest 7 is seated in a plate which carries a tool holder 10, while a forked projection 11 on the plate 9 is engaged on a roller 12 carried on a fixed arm 13 projecting from the bed. The tool is a strong, long tool with an arc-shaped cutting face 15, and it is held in position by screws 16. A toothed wheel 17 on the chuck, which is suitably driven e. g. by an electromotor or the like through the shaft 18, drives by means of the wheels 19, 20 a differential gearing 21, 22, 23 mounted in a revolving casing 40. The gear 23 is fixed on a shaft 30 which has a bevel gear 24 fixed thereon. The gear 24 meshes with a bevel gear 25 fixed on a vertical shaft 26. The shaft 26 is journalled centrally in the table and carries at its upper end a cam 27. A cam roller 29 is revolubly mounted on the under side of the slide 7 and is held against the slide by a spring 28. The shaft 30 of the differential gearing carries a crank disk 31 which, by means of a connecting rod 32 and a pawl 33, drives a ratchet wheel 34 carried on a shaft 35. This latter drives a worm 36 which meshes with a worm wheel 37 formed on the table 6 and by means of toothed wheels 38, 39 rotates the casing 40 of the differential gearing 21, 22, 23.

The groove in the roll 4 has for example the form shown, in which that is to say, a wider portion 41 of the groove lies diagonally opposite a narrow portion 42, these parts merging smoothly into one another. The groove is pre-formed by turning, pressing, forging or the like and is then finished by the new apparatus. This latter may however be used to cut the groove from the unshaped material. The roll 4 is so chucked relatively to the table 6, that the prolongation of the axis of rotation 43 of the latter (see Figs. 2 and 5) runs tangentially to the periphery of the roll. The centre of curvature 44 of the cutting face 15 of the tool 14 lies in the axis of the pivot pin 8 which connects the parts 7, 9 and is moved with the slide 7 when the machine is in operation by the cam 27. In the position of the parts shown in Fig. 5 the cutting edge of the tool is attacking the left hand outer edge of the wide portion of the part 41 of the groove. The angular velocity of the roll 4 rotating in the direction indicated by the arrow 45 agrees with the angular velocity of the cam 27 which rotates in the direction indicated by the arrow 46. The tool moves therefore from left to right during half a revolution of the shaft 4 until it reaches the position shown in Fig. 6 and then back to the original position, a corresponding cut being taken off along the contour of the groove. By the feed mechanism 31, 37 the centre of curvature 44 is caused to travel gradually into the position shown in Fig. 7, then into the position shown in Fig. 9 etc., and as owing to the driving of the casing 40 of the differential gearing the cam 27 has imparted to it in addition to its normal driving speed an additional rotation in the direction in which the table 6 rotates, so that its major axis 47 when in the position shown in Fig. 4 always coincides with the axis of the slide rest 7, the cutting edge in every position of the slide rest 7, in which the tool holder 10 and therefore the tool 14 is moved radially to the axis of the roll, always travels accurately in the direction of the centre of curvature of the bearing member 6, and then back again (see Figs. 8 and 10). As the plate 9 with the tool holder is prevented by the roller 12 from rotating with the slide rest 7 the cutting edge 15 makes a rocking movement about the roller 12 in its passage from one edge to the other of the groove as it is advanced, the tool being always held substantially at right angles to the axis of the roll.

As shown in Figs. 11 and 12 the slide rest carrying the tool holder consists of the two parts 48, 49 which can be moved relatively to each other by the screw-threaded spindle 50. The tool holder has also two parts 51, 52 which are adjusted by the screw 53. The movement of the parts 48, 49 of the slide rest and the variation of the eccentricity of the pivot pin 8 permit of the adjustment of the apparatus for the treatment of grooves of different sizes, while the adjustment of the parts 51, 52 of the tool holder enables oval grooves 54 or 55 as the case may be to be produced as shown in Figs. 14 and 15. If the cutting edge 15 be set back radially from the axis of the roll relatively to the centre of curvature 43 of the bearing member 6, then the cutting edge describes, as it passes through the groove, an ellipse, the major axis of which lies at right angles to the axis of the roll (see Fig. 14) while if set in the opposite direction the cutting edge describes an ellipse the major axis of which is parallel with the axis of the roll (see Fig. 15). For adaptation to the adjustments of the tool the roll 4 must be given either a larger diameter (see Fig. 14) or a smaller diameter (see Fig. 15) or the entire controlling apparatus is arranged on a carriage in order to enable it to be adjusted relatively to the roll 4.

In the constructional form shown in Fig. 16 the fixed arm 13 and the roller 12 respectively are replaced by a roller 55 which is adjustable on a crank disc 54 and is rotatably mounted on the other side of the axis of the roller in a casing 56. It is driven according to the position of a travelling wedge 58 moved by a hand lever 57 by toothed wheels 59, 60 from the bearing member 6 or through a bevel wheel 61, a shaft 62 and bevel wheels 63, 64 from the driving mechanism for the cam 27. The roller 55 moves in the slot 65 in an arm 66 on the tool holder plate 9.

When the roller 55 is adjusted as shown in Fig. 17 it travels, after the driving mechanism 59, 60 has been thrown into operation, during the passage of the tool through the groove 41, through an angle of 180° from right to left in the direction indicated by the arrow 67. Owing to the oblique position of the tool 14 inclined flanks 68 are produced on the groove 41. The angular position of these flanks will be a different one if the roller 55 be adjusted in the direction of the centre of the cam 54. In the central position the divergence from the arc shape of the cross section of the groove is at least possible. After throwing the driving mechanism 61-64 into operation flanks are produced on the wide part 41 of the groove, while the narrow part 42 of the groove remains without any flank bevelling. This is due to the fact that in that case the crank disc 54 also makes a revolution for every revolution of the cam 27. When the left hand flank 68 is being cut the roller 55 is therefore located on the right hand side when the tool operates on the part 41 of the groove, and on the left hand side when the narrow part 42 of the groove is operated on. The reverse positions arise when the right hand flank 68 of the groove 41 is operated on. The controlling parts can be so adjusted that other definite points on the groove are provided with bevelled flank. If on the other hand the roller 55 in the slot 68 in the crank disc 54 be set to the left hand side when the left hand edge of the groove is being cut, and the driving mechanism 59, 60 thrown into operation, a groove without any flank bevelling at all will be produced.

The shape of the groove is determined by the form of the cutting edge of the tool. If this be flattened off at the apex for example, a groove which is flattened in the middle will be produced.

Instead of the tool above described a driven grinding disc may be used for forming the groove.

I claim:

1. In a roll grooving lathe having a bed, a live center and a dead center, a reciprocable slide supported from the lathe bed, tool holder means having pivotal connection with the slide, an arm projecting outwardly from said tool holder means, a guide member engaging the arm to prevent rotation of the tool holder means, means to effect rotation of the slide, a cam member supported in the bed, means on the slide engaging the cam member to cause longitudinal movements of the slide during its rotation, and means to rotate said cam member relative to the rotation of the slide.

2. In a roll grooving lathe having a bed, a live center and means to drive the latter, a table rotatably mounted in said bed, a cam shaft rotatably mounted in said table and centrally thereof, a slide mounted on said table to move thereacross, a pattern cam fixed on the upper end of said shaft, means on said slide engaging said cam to reciprocate the slide upon relative rotation of the table and shaft, a pivot pin carried by said slide, a plate member pivoted on said pin, a tool holder carried by said plate member, an arm projecting from said plate member, a guide engaging said arm and forming a fixed point on which said plate member reciprocates and oscillates, means operatively connected with the live center and driving said shaft, and other means driven by the last mentioned means for rotating said table.

3. In a roll grooving lathe having a bed, a live center and means to drive the latter, a table rotatably mounted in said bed, a cam shaft rotatably mounted in said table and centrally thereof, a slide mounted on said table to move thereacross, a pattern cam fixed on the upper end of said shaft, means on said slide engaging said cam to reciprocate the slide upon relative rotation of the table and shaft, a pivot pin carried by said slide, a plate member pivoted on said pin, a tool holder carried by said plate member, an arm projecting from said plate member, a guide engaging said arm and forming a fixed point on which said plate member reciprocates and oscillates, a driving shaft journalled in said bed and geared to said live center, a driven shaft alined with said driving shaft and geared to said cam shaft, a differential gearing connecting the driving and driven shafts and including a rotatable housing and an idler gear carried thereby, and means actuated by the rotation of the driven shaft and rotating said table and housing.

4. In a roll grooving lathe having a bed, a live center and means to drive the latter, a table rotatably mounted in said bed, a cam shaft rotatably mounted in said table and centrally thereof, a slide mounted on said table to move thereacross, a pattern cam fixed on the upper end of said shaft, means on said slide engaging said cam to reciprocate the slide upon relative rotation of the table and shaft, a pivot pin carried by said slide, a plate member pivoted on said pin, a tool holder carried by said plate member, an arm projecting from said plate member, a guide engaging said arm and forming a fixed point on which said plate member reciprocates and oscillates, a driving shaft journalled in said bed and geared to said live center, a driven shaft alined with said driving shaft and geared to said cam shaft, a differential gearing connecting the driving and driven shafts and including a rotatable housing and an idler gear carried thereby, crank means carried by said driven shaft, a shaft extending parallel to the driving and driven shafts, a pawl and ratchet for rotating the last mentioned shaft, a link connecting the pawl and said crank means, a worm on the last mentioned shaft, a worm wheel on said table and meshing with said worm, and gearing connecting said housing and the last mentioned shaft.

5. In a roll grooving lathe having a bed, a live center and means to drive the latter, a table rotatably mounted in said bed, a cam shaft rotatably mounted in said table and centrally thereof, a slide mounted on said table to move thereacross, a pattern cam fixed on the upper end of said shaft, means on said slide engaging said cam to reciprocate the slide upon relative rotation of the table and shaft, a pivot pin carried by said slide, a plate member pivoted on said pin, a tool holder carried by said plate member, an arm projecting from said plate member, a guide engaging said arm and forming a fixed point on which said plate member reciprocates and oscillates, means operatively connected with the live center and driving said shaft, other means driven by the last mentioned means for rotating said table, and means to adjust said tool holder on said plate member toward and from said pivot pin.

6. In a roll grooving lathe having a bed, a live center and means to drive the latter, a table rotatably mounted in said bed, a cam shaft rotatably mounted in said table and centrally thereof, a slide mounted on said table to move thereacross, a pattern cam fixed on the upper end of said shaft, means on said slide engaging said cam to reciprocate the slide upon relative rotation of the table and shaft, a pivot pin carried by said slide, a plate member pivoted on said pin, a tool holder carried by said plate member, an arm projecting from said plate member, a guide engaging said arm and forming a fixed point on which said plate member reciprocates and oscillates, a driving shaft journalled in said bed and geared to said live center, a driven shaft alined with said driving shaft and geared to said cam shaft, a differential gearing connecting the driving and driven shafts and including a rotatable housing and an idler gear carried thereby, means actuated by the rotation of the driven shaft and rotating said table and housing, and means to adjust said tool holder on said plate member toward and from said pivot pin.

7. In a roll grooving lathe having a bed, a live center and means to drive the latter, a table rotatably mounted in said bed, a cam shaft rotatably mounted in said table and centrally thereof, a slide mounted on said table to move thereacross, a pattern cam fixed on the upper end of said shaft, means on said slide engaging said cam to reciprocate the slide upon relative rotation of the table and shaft, a pivot pin carried by said slide, a plate member pivoted on said pin, a tool holder carried by said plate member, an arm projecting from said plate member, a guide engaging said arm and forming a fixed point on which said plate member reciprocates and oscillates, a driving shaft journalled in said bed and geared to said live center, a driven shaft alined with said driving shaft and geared to said cam shaft, a differential gearing connecting the driving and driven shafts and including a rotatable housing and an idler gear carried thereby, crank means carried by said driven shaft, a shaft extending parallel to the driving and driven shafts, a pawl and ratchet for rotating the last mentioned shaft, a link connecting the pawl and said crank means, a worm on the last mentioned shaft, a worm wheel on said table and meshing with said worm, gearing connecting said housing and the last mentioned shaft, and means to adjust said tool holder on said plate member toward and from said pivot pin.

8. In a roll grooving lathe having a bed, a live center and means to drive the latter, a table rotatably mounted in said bed, a cam shaft rotatably mounted in said table and centrally thereof, a slide mounted on said table to move thereacross, a pattern cam fixed on the upper end of said shaft, means on said slide engaging said cam to reciprocate the slide upon relative rotation of the table and shaft, a pivot pin carried by said slide, a plate member pivoted on said pin, a tool holder carried by said plate member, an arm projecting from said plate member, a guide engaging said arm and forming a fixed point on which said plate member reciprocates and oscillates, means operatively connected with the live center and driving said shaft, other means driven by the last mentioned means for rotating said table, a rotary member supporting said guide and whereon said guide is mounted for adjustment toward and from the center of rotation of said rotary member, means to hold the guide in adjusted position, and gearing connecting said rotary member and table.

9. In a roll grooving lathe having a bed, a live center and means to drive the latter, a table rotatably mounted in said bed, a cam shaft rotatably mounted in said table and centrally thereof, a slide mounted on said table to move thereacross, a pattern cam fixed on the upper end of said shaft, means on said slide engaging said cam to reciprocate the slide upon relative rotation of the table and shaft, a pivot pin carried by said slide, a plate member pivoted on said pin, a tool holder carried by said plate member, an arm projecting from said plate member, a guide engaging said arm and forming a fixed point on which said plate member reciprocates and oscillates, a driving shaft journalled in said bed and geared to said live center, a driven shaft alined with said driving shaft and geared to said cam shaft, a differential gearing connecting the driving and driven shafts and including a rotatable housing and an idler gear carried thereby, means actuated by the rotation of the driven shaft and rotating said table and housing, a rotary member supporting said guide and whereon said guide is mounted for adjustment toward and from the center of rotation of said rotary member, means to hold the guide in adjusted position, and gearing connecting said rotary member and table.

10. In a roll grooving lathe having a bed, a live center and means to drive the latter, a table rotatably mounted in said bed, a cam shaft rotatably mounted in said table and centrally thereof, a slide mounted on said table to move thereacross, a pattern cam fixed on the upper end of said shaft, means on said slide engaging said cam to reciprocate the slide upon relative rotation of the table and shaft, a pivot pin carried by said slide, a plate member pivoted on said pin, a tool holder carried by said plate member, an arm projecting from said plate member, a guide engaging said arm and forming a fixed point on which said plate member reciprocates and oscillates, a driving shaft journalled in said bed and geared to said live center, a driven shaft alined with said driving shaft and geared to said cam shaft, a differential gearing connecting the driving and driven shafts and including a rotatable housing and an idler gear carried thereby, crank means carried by said driven shaft, a shaft extending parallel to the driving and driven shafts, a pawl and ratchet for rotating the last mentioned shaft, a link connecting the pawl and said crank means, a worm on the last mentioned shaft, a worm wheel on said table and meshing with said worm, gearing connecting said housing and the last mentioned shaft, a rotary member supporting said guide and whereon said guide is mounted for adjustment toward and from the center of rotation of said rotary member, means to hold the guide in adjusted position, and gearing connecting said rotary member and table.

11. Apparatus for cutting grooved rolls, consisting of a bearing with a driving mechanism for the roll, a device adjoining the roll with a pedestal body rotating in accordance with the feed, a rotatable table arranged thereon, means for moving the table, a slide mounted on said table to move thereacross, a pin on said slide, a tool holder on the pin, means for supporting said tool holder whereby one end can shift only in cross direction to the roll plane, a tool in said tool holder, and means for reciprocating said tool transversely of the roll axis.

12. Apparatus for cutting grooved rolls consisting of a bearing with driving means for the roll, a device adjoining the roll having a pedestal body rotating in accordance with the feed, said pedestal body having a table rotating with it and in this rotation being moved to and fro by driven means, said table being connected with the tool holder by means of a pin, the end of said tool holder directed toward the outside being shiftably arranged transversely to the roll axis by means of a driven crank pin, a tool in said tool holder, and means for reciprocating the tool transversely of the roll axis.

13. In a roll grooving lathe having a bed, a live center and a dead center, means to drive said live center, a reciprocable slide supported from the lathe bed, tool holder means having pivotal connection with the slide, an arm projecting outwardly from said tool holder means, a guide member engaging the arm to prevent rotation of the tool holder means, means to effect rotation of the slide, a tool in said tool holder, and means to reciprocate said tool positively and transverse to the axis of the work spindle.

14. In a roll grooving lathe having a bed, a live center and a dead center, means for driving said live center, a reciprocable slide supported from the lathe bed, tool holder means having a tool and pivotal connection with the slide, means for positively reciprocating said tool transverse to the axis of the work spindle, an arm projecting outwardly from said tool holder means, a guide member engaging the arm to prevent rotation of the tool holder means, and means to effect rotation of the slide eccentrically of the pivotal connection of said tool holder means.

15. In a roll grooving lathe having a bed, a live center and a dead center forming a work spindle, means to drive the live center, a reciprocable slide supported from the lathe bed, tool holder means having a tool and pivotal connection with the slide, an arm projecting outwardly from said tool holder means, a guide member engaging the arm to prevent rotation of the tool holder means, means to effect rotation of the slide eccentrically of the pivotal connection of said tool holder means, means for effecting predetermined reciprocal movements of said slide during its rotation, and means for positively reciprocating said tool transversely to the axis of the work spindle.

16. In a roll grooving lathe having a bed, a live center and a dead center forming a work spindle, means for driving a live center, a reciprocal slide supported from the lathe bed, tool holder means having a tool and pivotal connection with the slide, an arm projecting outwardly from said tool holder means, a guide engaging the arm to prevent rotation of the tool holder means, means to effect rotation of the slide eccentrically of the pivotal connection of said tool means to positively reciprocate the tool transversely to the axis of the work spindle, and means carried by the slide to vary the eccentricity of said pivotal connection.

17. In a roll grooving lathe, a work spindle, a reciprocable slide supported from the lathe bed, tool holder means having a tool and pivotal connection with the slide, an arm projecting outwardly from said tool holder means, a guide member engaging the arm to prevent rotation of the tool holder means, means to effect rotation of the slide, means to effect movement of said guide member through a circular path, and means for reciprocating said tool positively and transversely to the axis of the work spindle.

HANS BECKER.